United States Patent Office 3,334,180
Patented Aug. 1, 1967

3,334,180
TELEVISION RECEIVER CONTROL CIRCUITRY COUPLED TO THE PICTURE TUBE SCREEN GRID FOR REGULATING BEAM CURRENT

Bernard D. Loughlin, Centerport, N.Y., assignor to Hazeltine Research Inc., a corporation of Illinois Filed Nov. 20, 1963, Ser. No. 324,959
19 Claims. (Cl. 178—7.5)

ABSTRACT OF THE DISCLOSURE

Apparatus is disclosed which provides control circuitry coupled to the screen grid of a picture tube to vary the potential of the screen grid with respect to the cathode of the tube in response to variations in the average value of the video signal. The control circuitry thereby regulates the tube beam current to prevent such objectionable effects as glare as well as to prevent power supply overload on scenes of high average brightness. The control circuitry additionally maintains black in the reproduced image by correspondingly adjusting the interelectrode biases of the tube to prevent any change in the cutoff potential.

The present invention relates to a picture control circuit for a television receiver, and, more particularly, to a control circuit useful in a black level stabilized receiver for improving the quality of the reproduced picture.

One of the major problems encountered in black level stabilization system design, whether the stabilization be achieved by direct-current (D-C) restoration or by D-C coupling, is that the possibility exists that the high D-C beam currents required on scenes of high average brightness could overload the type of high voltage power supply circuit presently being used in television receivers. Such overloading would be observed by the viewer as substantial changes in the width to height ratio of the reproduced picture dimensions, improper horizontal scanning operation, and other such similarly objectionable effects.

Even if the black level stabilized receiver were designed with sufficient scanning circuit power capability to eliminate such overload effects, the variations in reproduced picture brightness may prove objectionable to the viewer. Such an objectionable situation may very well be created whenever the transmitted scene changes from one of low average brightness to one of high average brightness, thereby producing an irritating glare effect.

The idea is presented in applicant's pending application, Ser. No. 309,773, filed Sept. 18, 1963, and entitled, "Picture Control Apparatus for a Television Receiver," that it is possible to minimize both these effects by limiting the amount of beam current flowing in the cathode-ray type picture tube on scenes having a high average brightness value. This concept is presented in that application with reference to a keyed automatic-gain-control circuit which operates to reduce the magnitude of the signal developed by the video amplifier as scene brightness increases, and, furthermore, in such a manner that black level performance is not impaired thereby. As will be made clear hereinafter, it is also possible to achieve these same results by performing a function similar to this video signal reduction function at the cathode-ray tube itself.

It is an object of the present invention, therefore, to provide a picture control circuit for a television receiver which operates to minimize any annoying subjective effects produced on the viewer due to changes in scene brightness and to prevent overload of the high voltage power supply on scenes having a high average brightness value.

It is another object of the present invention to provide a picture control circuit having the characteristics set forth in the above object and which additionally operates to maintain black level constant in the reproduced picture.

Thus, in accordance with the present invention, there is provided a picture control circuit for a television receiver utilizing a cathode-ray tube, including means for supplying a video signal having an average value which may vary from scene to scene. The control circuit also includes means responsive to the video signal for coupling at least a portion of the video signal and a D-C level to the cathode-ray tube, and means responsive to the D-C level for varying the potential of the screen grid of the tube to limit the amount of beam current flowing in the tube on scenes having a high average brightness value.

For a better understanding of the present invention together with other and further objects thereof, reference is had to the following description taken in connection with the accompanying drawings, and its scope will be pointed out in the appended claims.

Referring to the drawings.

*General*

Figure 1:
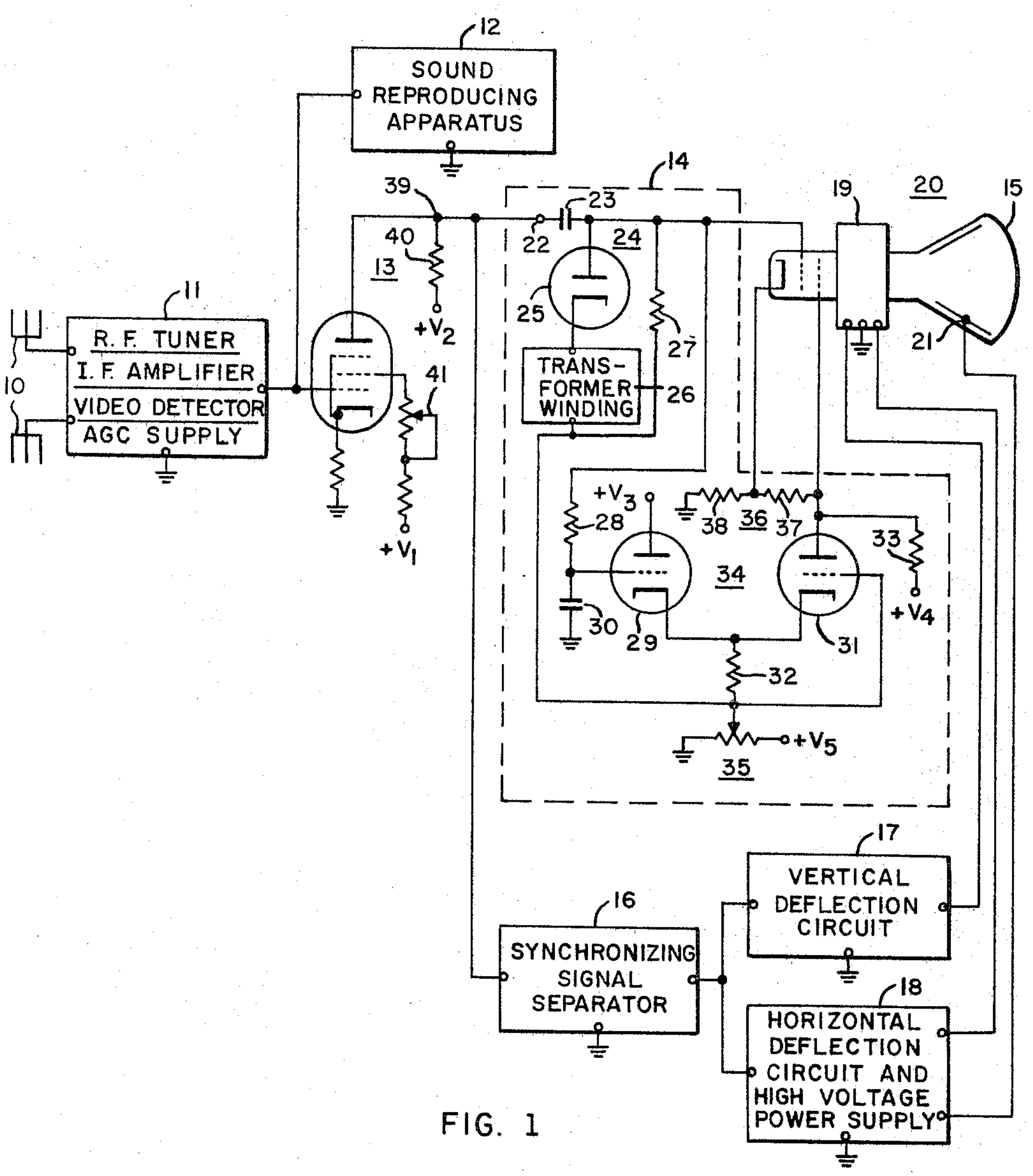
FIG. 1 is a circuit diagram, partly schematic, of a television receiver including a picture control circuit constructed in accordance with a particular form of the present invention.

Referring to FIG. 1, there is shown a television receiver embodying a picture control circuit constructed in accordance with one form of the present invention. Thus, with the exception of the control circuit, and unless otherwise noted, the receiver may be of conventional construction. The receiver comprises, in part, antenna system 10 coupled to the input of unit 11 which includes the usual radio-frequency (RF) tuner, intermediate-frequency (IF) amplifier, video detector, and automatic-gain-control supply from which are derived a sound modulated intercarrier beat note component and a video signal component. The sound component is applied to sound reproducing apparatus 12 wherein it is amplified, detected, and reproduced by the sound reproducing device.

The video signal component is D-C coupled from the video detector in unit 11 to the control grid of video amplifier 13 wherein it is amplified, reversed in polarity, and applied through the control circuit 14 to a cathode-ray type picture tube 15 in a manner to be subsequently described. The video signal developed by amplifier 13 is also applied to synchronizing signal separator 16 wherein the synchronizing pulses in the composite signal are stripped and applied to the vertical and horizontal deflection circuits 17 and 18. Beam deflection signals are developed in these units in the usual manner and applied to the deflection yoke 19 of picture reproducing apparatus 20. Unit 18 additionally includes a high voltage power supply which provides the operating potential required by the high voltage anode 21 of picture tube 15. As will become clear hereinafter, control circuit 14, as embodied in FIG. 1, operates to limit the amount of beam current flowing in picture tube 15 and to maintain correct black level operation in the reproduced image by varying the potential of the screen grid and cathode of picture tube 15, respectively, as the average brightness value of the transmitted scene varies. In this manner, any annoying subjective effects produced on the viewer due to changes in scene brightness, as well as any overload effects produced on scenes of high average brightness, are minimized.

*Description and operation of picture control circuit 14 of FIG. 1*

Referring now more particularly to the picture control circuit 14 which embodies one form of the present invention, the arrangement there represented includes means, such as input terminal 22, for supplying a video signal having an average value which may vary from scene to scene.

Control circuit 14 also includes means, such as the signal translating path including input terminal 22, capacitor 23, and D-C restorer circuit 24, for coupling the video signal including the D-C component thereof, to the control grid of picture tube 15. D-C restorer circuit 24 is of the keyed variety and consists of diode 25, pulse circuit winding 26, connected in the cathode circuit of diode 25 and through which the keying pulses are supplied, and resistor 27, connected between the anode of diode 25 and the end of winding 26 remote from the cathode of diode 25. Winding 26 may be a winding on the horizontal output transformer in unit 18 connected in such a manner as to give the proper polarity pulses. The D-C restored signal is developed at the anode of diode 25.

Control circuit 14 further includes means for deriving a signal representative of the average value of the supplied video signal. Such means includes resistor 28, connected between the anode of diode 25 and the grid of triode vacuum tube 29, through which the D-C restored signal is coupled and capacitor 30, connected between the grid of tube 29 and ground, which provides a short circuit path to ground for the A-C components of the D-C restored signal coupled through resistor 28. In this manner, the signal present at the grid of triode 29 is entirely D-C and it is this signal which is to be understood as the just mentioned derived signal.

Vacuum tube triodes 29 and 31 and resistors 32 and 33 comprise a D-C amplifying circuit means 34 responsive to this derived signal for varying the potential of the screen grid of picture tube 15 to limit the amount of beam current flowing therein on scenes having a high average brightness value. Resistor 32, common to both the output circuit of triode 29 and the input circuit of triode 31, is connected, on the one side, to the junction point of the cathode of triode 29, the anode of which is connected to an energizing source $+V_3$, with the cathode of triode 31, the anode of which is returned to an energizing source $+V_4$ through load resistor 33, and, on the other side, to the junction point of the movable tap of voltage divider 35, the grid of triode 31, the end of resistor 27 remote from the anode of diode 25 and the end of winding 26 remote from the cathode of diode 25. One terminal of voltage divider 35 is connected to an energizing source $+V_5$ while the other terminal is grounded.

Control circuit 14 finally includes means 36 responsive to the variations in the potential of the screen grid of picture tube 15 for varying the cathode potential of picture tube 15 to maintain correct black level operation in the reproduced picture. Means 36 includes two resistors 37 and 38 serially connected between the junction of the anode of troide 31 with the screen grid of picture tube 15 and ground, the cathode of picture tube 15 being connected to the junction of the two resistors.

It is to be understood in the foregoing description that the invention is not limited to the A-C coupling—D-C restoration arrangement shown in FIG. 1. D-C coupling might be employed between the video amplifier 13 and picture tube 15 without upsetting the operation of the invention. Such an arrangement as the latter will be described subsequently with reference to the control circuit of FIG. 2.

Although control circuit 14, as embodied in FIG. 1 operates to reduce any annoying subjective effects which may be produced upon the viewer due to changes in scene brightness and to prevent power supply overload on scenes having a high average brightness value, the discussion relating to its operation will be limited to the feature of overload protection. This is not to be construed as a belittling of the subjective impression feature, but as a means of simplifying the discussion that follows. It is to be understood that in limiting the amount of beam current flowing in the picture tube 15 control circuit 14 prevents the reproduced picture from becoming excessively bright so that changes in scene brightness, as from a low brightness scene to a high brightness scene, do not prove objectionable to the viewer. This concept is to be carried throughout the forthcoming description relating to control circuit 14 as well as to the other forms of the invention described, though no mention of it is made. Furthermore, it is to be understood that the subjective impression feature applies even if the high voltage supply located in unit 18 is not susceptible to overload.

In operation, the A-C components of the video signal developed at output terminal 39 of video amplifier 13 are coupled through input terminal 22, and capacitor 23 to the anode of diode 25 but the translation of the D-C component is prevented by capacitor 23. Thus, if no provision were made for restoring the D-C component, the translated signal would be lacking information representative of the average brightness value of the transmitted scene but would be representative only of the fluctuations in light with respect to that average value. In this regard, it is to be understood that the polarity of the video detector in unit 11 is such that, at terminal 22, the video signal synchronizing pulses extend in a negative direction from the blanking level.

During the blanking and synchronizing portions of the video signal, horizontal deflection circuit 18 develops large amplitude flyback pulses which are supplied through winding 26 in the negative-going direction to the cathode of diode 25. These pulses combine with the A-C components of the video signal to restore the D-C component in the translated signal, the D-C restored signal being developed at the anode of diode 25 for a small portion of the signal. D-C restorer circuit 24 may be either of the sync peak keyed or back porch keyed variety, depending on the relative phasing of the supplied flyback pulses with respect to the supplied video signal.

As is well known and understood, the amount of beam current flowing in picture tube 15 for any given scene is proportional to the product of the transconductance or $g_m$, of the tube and the magnitude of the signal measured from raster cutoff applied between its grid and cathode for that scene. Furthermore, it is additionally well known that the transconductance of the tube varies inversely with the voltage on its screen grid, so that an increase in screen grid voltage with respect to the cathode voltage has the effect of decreasing the $g_m$ of the tube while a decrease in screen grid voltage with respect to the cathode voltage has the effect of increasing the $g_m$ of the tube.

Assume that the video signal developed at output terminal 39 of amplifier 13 represents a scene of medium average brightness. This signal is applied directly to the control grid of picture tube 15 and is also coupled through resistor 28 to the grid of triode 29. The application of the signal to triode 29, and, more particularly, the application of the D-C level, causes D-C current to flow within triodes 29 and 31 and through resistors 32 and 33, thereby establishing a D-C voltage level at the anode of triode 31 which is applied to the screen grid of picture tube 15. The beam current that flows within picture tube 15 upon such a medium average brightness scene is not sufficient to overload the power supply in unit 18.

Assuming that the video signal developed at output terminal 39 changes to one representing a scene of high average brightness value, the signal at the anode of diode 25 will then have a D-C level more positive than the D-C level of the medium average brightness scene. This change in the positive direction in the D-C level at the anode of diode 25, when coupled through resistor 28 to the grid of triode 29, causes an increase in the D-C current flowing in triode 29 and through resistor 32. The direction of increased current flow is such that the voltage at the cathode of triode 31 increases with respect to the voltage at its grid causing a decrease in current in triode 31. As a result, the voltage at the anode of triode 31 increases, as does the voltage at the screen grid of picture tube 15.

As the average brightness value of the transmitted scene increases then, there is an increase in the voltage at the screen grid of picture tube 15 with respect to the voltage at the cathode. Thus, the $g_m$ of the picture tube is reduced and the beam current that would flow on a high average brightness scene is prevented from reaching that value of beam current that would otherwise cause the power supply in unit 18 to overload.

Assume that the cathode potential of the picture tube 15 is initially set at a value to correctly reproduce black for a medium average brightness scene, i.e., that the black level in the signal at the control grid of picture tube 15 for a medium average brightness scene corresponds to cutoff potential in the picture tube. An increase in scene brightness then, which as just described, produces an increase in the potential at the screen grid of picture tube 15, causes a change in the cutoff potential of the picture tube 15. This change in turn is in such a direction as to cause beam current to flow corresponding to the video signal black level. As a result there would be a shift of black in the reproduced picture and what had previously reproduced as black would then reproduce as a dirty grey. However, in accordance with the teachings of the present invention, control circuit 14 operates to counteract this effect by coupling a portion of the variation in screen grid potential to the cathode of picture tube 15 through the resistance divider network 37, 38. Thus, as scene brightness increases, a portion of the increased D-C voltage developed at the screen grid of picture tube 15 is coupled through network 37, 38 to the cathode of picture tube 15 to offset the increase in cutoff potential of tube 15 resulting from the increase in screen potential. In this manner correct black level operation is maintained in the reproduced picture.

If the video signal developed at terminal 39 then changes to one representing a scene of low average brightness, the signal at the anode of diode 25 would then have a D-C level less positive than the D-C level of either the high or medium average brightness scene. This change in the negative direction in the D-C level at the anode of diode 25 causes a decrease in the D-C level at the grid of triode 29, a decrease in current in triode 29, a corresponding decrease in voltage at the cathode of triode 31 with respect to its grid, and, therefore, an increase in current in triode 31. As a result, the D-C voltage at the anode of triode 31, hence the voltage at the screen grid of picture tube 15, also decreases. No overload problem exists on such a low average brightness scene since the average value of beam current flowing in picture tube 15 is low.

Correct black level operation, however, is still maintained in the reproduced picture as the average brightness decreases. Specifically, as scene brightness decreases, the D-C voltage developed at the screen grid of picture tube 15 also decreases, as previously described, as does the voltage coupled to the cathode of picture tube 15. This decrease in voltage at the cathode is such as to offset the decrease in cutoff potential of tube 15 which would otherwise occur due to the decrease in the screen potential.

Figure 2:
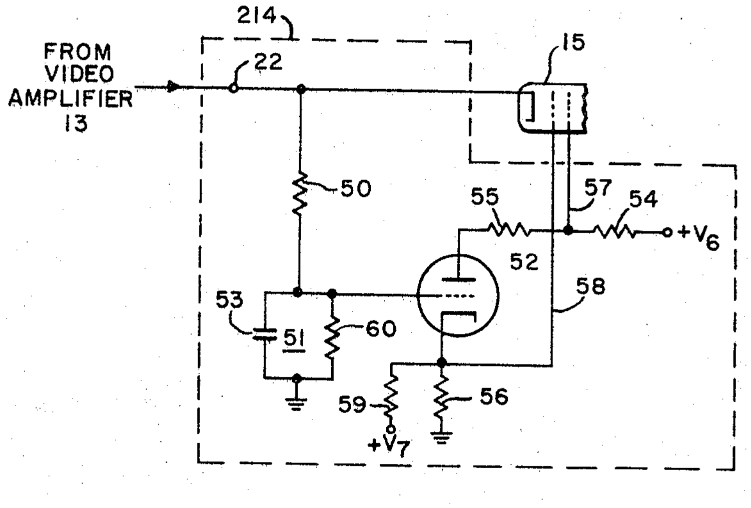
FIG. 2 illustrates a modified form of control circuit in accordance with the invention.

*Picture control circuit 214 of FIG. 2*

There is shown in FIG. 2 a modified form of picture control circuit 214 differing from the control circuit of FIG. 1 in that picture tube 15 is cathode-driven rather than grid-driven. In addition, D-C coupling is employed between the video amplifier stage 13 and the picture tube 15, instead of A-C coupling with subsequent D-C restoration. In the description that follows it is to be understood that the polarity of the video detector in unit 11 is such that the synchronizing pulse peaks of the video signal supplied to input terminal 22 extend in a positive direction from the blanking level.

In operation, an increase in scene brightness produces a change in the negative direction in the D-C level of the supplied video signal at terminal 22, and, after translation through resistor 50 and network 51, produces a decrease in the D-C component at the grid of vacuum tube triode 52. This decrease in D-C voltage at the grid causes less current to flow through triode 52 and resistors 54, 55, and 56, thereby producing an increase in D-C voltage at the junction of resistors 54 and 55 and a decrease in D-C voltage at the cathode of triode 52. The increase in D-C voltage at the junction of resistors 54 and 55 is applied through conductor 57 to the screen grid of picture tube 15 to limit the amount of beam current flowing in picture tube 15 by decreasing the $g_m$ of the tube. As a result, power supply overload is prevented in a manner similar to that described with reference to control circuit 14 of FIG. 1. The decrease in D-C voltage at the cathode of triode 52 is coupled through conductor 58 to the control grid of picture tube 15 to offset the increase in cutoff potential of tube 15 resulting from the increase in screen potential, so that correct black level operation is maintained in the reproduced picture.

On the other hand, a decrease in scene brightness produces a change in the positive direction in the D-C level of the video signal supplied to input terminal 22, an increase in the D-C component at the grid of triode 52, an increase in current flowing through triode 52 and resistors 54, 55 and 56, a decrease in the D-C voltage at the junction of resistors 54 and 55, and an increase in D-C voltage at the cathode of triode 52. The increase in D-C voltage at the cathode of triode 52 is coupled through conductor 58 to the control grid of picture tube 15 to offset the decrease in cutoff potential of tube 15 resulting from the decrease in screen potential, so that in this manner correct black level operation is once again correctly maintained in the reproduced picture. No overload problem is created as the average brightness value of the transmitted scene decreases since the average value of beam current flowing in picture tube 15 also decreases.

Figure 3:
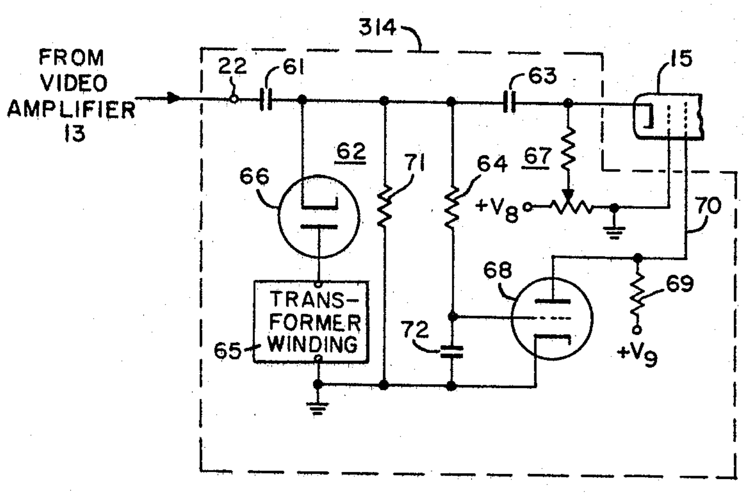
FIG. 3 illustrates another form of control circuit in accordance with the invention.

*Picture control circuit 314 of FIG. 3*

In the previous two embodiments of the invention it has been assumed that the D-C restorer or D-C coupled video signal has been coupled to either the control grid or cathode of picture tube 15. Another possible approach constructed in accordance with the invention is to employ A-C coupling of the video signal to either the control grid or the cathode of picture tube 15 and then to control the potential of the screen grid proportional to the average value of the transmitted scene with proper gain to produce D-C insertion. Such an approach is illustrated by control circuit 314 in FIG. 3 which, for example, utilizes A-C coupling to the cathode of the picture tube 15. It is to be understood in considering the operation of the control circuit 314 that the polarity of the video detector in unit 11 is such that the synchronizing pulses of the signal supplied to input terminal 22 extend in a positive direction from the blanking level.

In operation, the supplied video signal is coupled through capacitor 61 and D-C restorer circuit 62 to the junction point of capacitor 63 and resistor 64. The D-C restorer circuit 62 is similar to the one shown in control circuit 14 of FIG. 1 but of opposite polarity, so that in this case the flyback pulses supplied through winding 65 to the anode of diode 66 are of positive rather than negative polarity.

As the average brightness value of the transmitted scene varies, the level at which the video signal black level is made to appear at the cathode of picture tube 15 also varies due to the A-C coupling through capacitor 63. Thus, if brightness control 67 were adjusted so that the black level of a medium average brightness video signal just reaches black in the reproduced picture, then the black level of the high average brightness video signal would be reproduced as blacker than black while the black level of the low average brightness video signal would be reproduced as a shade of grey. However, these undesirable effects are compensated for by the D-C insertion feature of the embodiment of FIG. 3.

That is, if the average brightness value of the transmitted scene increases, as from a medium average brightness scene to a high average brightness scene, the D-C level in the D-C restored signal at the cathode of diode 66 changes in a negative direction, as does the D-C component at the grid of triode 68. Less current flows through triode 68 and resistor 69 causing an increase in potential at the anode of triode 68. This increase in D-C potential is applied through conductor 70 to the screen grid of picture tube 15 to vary the cutoff potential of the tube in such a manner as to track the variations in black level at the cathode caused by the A-C coupling through capacitor 63. It will also be noted that in addition to producing this D-C insertion effect, the increase in screen grid potential is in the direction to lower the $g_m$ of picture tube 15 and thereby is in the direction to reduce the average beam current flowing, so that overload is prevented on scenes of high average brightness.

In a similar manner, circuit 314 operates to decrease the D-C potential developed by tube 68 and applied through conductor 70 to the screen grid of picture tube 15 as the average brightness value of the transmitted scene decreases, as, for example, from a medium average brightness scene to a low average brightness scene, wherein the D-C level in the D-C restored signal at the cathode of diode 66 changes in a positive direction, to again maintain the video signal black level near cutoff. As was previously mentioned, no overload protection is necessary on such low average brightness scenes since the average beam current flowing in picture tube 15 is low.

To summarize, each of the three control circuits described operate to vary the potential of the screen grid of picture tube 15 with respect to the cathode in the same direction as variations in the average brightness value of the transmitted scene so as to prevent the overload of the high voltage power supply in unit 18 on scenes having a high average brightness value. However, whereas in control circuit 14 these variations are in the same direction as the variations in the average value of the supplied video signal or more specifically, in the same direction as the direction in which the D-C level of the supplied video signal changes with changes in scene brightness, are in a direction opposite to the variations in the average value of the supplied video signal in control circuits 214 and 314, i.e., opposite to the direction in which the D-C level of the supplied video signal changes with changes in scene brightness. In addition, each of the three control circuits operate to offset the change in the cutoff potential of picture tube 15 produced by the screen grid variations—control circuits 14 and 214, by varying the potential of the cathode and control grid of tube 15 respectively, in the same direction as variations in the average value of the supplied video signal, i.e., in the same direction as the direction in which the D-C level of the supplied video signal changes with changes in scene brightness, and control circuit 314, by varying the potential of the screen grid of tube 15 in a manner to produce D-C insertion.

While there have been described what are at present considered to be the preferred embodiments of this invention, it will be obvious to those skilled in the art that various changes and modifications may be made therein without departing from the invention and it is, therefore, aimed to cover all such changes and modifications as fall within the true spirit and scope of the invention.

What is claimed is:

1. A picture control circuit for a television receiver utilizing a cathode-ray tube comprising:
- means for supplying a video signal having an average value which may vary from scene to scene;
- means for deriving a signal representative of said average value;
- and means responsive to the derived signal for varying the potential of the screen grid of a cathode-ray tube to limit the amount of beam current flowing in said tube on scenes having a high average brightness value.

2. A picture control circuit for a television receiver in accordance with claim 1 in which the potential of the screen grid of the cathode-ray tube with respect to the cathode of said tube is varied in the same direction as variations in the average brightness value of the transmitted scene.

3. A picture control circuit for a television receiver in accordance with claim 1 in which the potential of the screen grid of the cathode-ray tube with respect to the cathode of said tube is varied in the same direction as variations in the average value of the supplied video signal.

4. A picture control circuit for a television receiver in accordance with claim 3 in which the supplied video signal is coupled to the control grid of the cathode-ray tube and in which there is also included means for varying the cathode potential of said tube in the same direction as variations in the average value of the supplied video signal to maintain correct black level operation in the reproduced image.

5. A picture control circuit for a television receiver in accordance with claim 4 in which the black level maintaining means varies the potential of the cathode of the cathode-ray tube in accordance with variations in the potential of the screen grid of said tube.

6. A picture control circuit for a television receiver in accordance with claim 1 in which the potential of the screen grid of the cathode-ray tube with respect to the cathode of said tube is varied in a direction opposite to variations in the average value of the supplied video signal.

7. A picture control circuit for a television receiver in accordance with claim 6 in which the supplied video signal is coupled to the cathode of the cathode-ray tube and in which there is also included means for varying the potential of the control grid of said tube in the same direction as variations in the average value of the supplied video signal to maintain correct black level operation in the reproduced image.

8. A picture control circuit for a television receiver utilizing a cathode-ray tube comprising:
- means for supplying a video signal having an average value which may vary from scene to scene;
- means for A-C coupling said signal to the cathode-ray tube;
- means for deriving a signal representative of the average value of said signal;
- and means responsive to the derived signal for varying the potential of the screen grid of the cathode-ray tube with respect to the cathode of said tube to limit the amount of beam current flowing in said tube on scenes having a high average brightness value and to produce D-C insertion to maintain correct black level operation in the reproduced picture, the potential of the screen grid with respect to the cathode being varied in a direction opposite to variations in the average value of the supplied video signal.

9. A picture control circuit for a television receiver utilizing a cathode-ray tube, comprising:
means for supplying a video signal having an average value which may vary from scene to scene;
means responsive to the video signal for coupling at least a portion of said video signal and a D-C level to the cathode-ray tube;
and means responsive to the D-C level for varying the potential of the screen grid of the tube to limit the amount of beam current flowing in said tube on scenes having a high average brightness value.

10. A picture control circuit for a television receiver utilizing a cathode-ray tube, comprising:
means for supplying a video signal having an average value which may vary from scene to scene;
means responsive to the video signal for coupling at least a portion of said video signal and a D-C level representative of the average value of the video signal to the cathode-ray tube;
and means responsive to the D-C level for varying the potential of the screen grid of the tube to limit the amount of beam current flowing in said tube on scenes having a high average brightness value.

11. A picture control circuit for a television receiver as described in claim 10, wherein the coupling means includes a D-C voltage generating means for developing the D-C level, and couples the A-C portion of the video signal and the D-C level to the cathode-ray tube.

12. A picture control circuit for a television receiver as described in claim 10, wherein the coupling means D-C couples the supplied video signal to the cathode-ray tube so that the D-C level is the D-C component of the supplied video signal.

13. A picture control circuit for a television receiver as described in claim 10, wherein the potential of the screen grid of the cathode-ray tube measured with respect to the cathode of said tube is varied in the same direction as variations in the average value of the supplied video signal.

14. A picture control circuit for a television receiver as described in claim 13, wherein the coupling means couples the video signal portion and the D-C level to the control grid of the cathode-ray tube, and wherein there is also included means for varying the cathode potential of said tube in the same direction as variations in the average value of the supplied video signal to correctly reproduce black level in the supplied video signal as black in the reproduced image.

15. A picture control circuit for a television receiver as described in claim 10, wherein the potential of the screen grid of the cathode-ray tube measured with respect to the cathode of said tube is varied in a direction opposite to variations in the average value of the supplied video signal.

16. A picture control circuit for a television receiver as described in claim 15, wherein the coupling means couples the video signal portion and the D-C level to the cathode of the cathode-ray tube and in which there is also included means for varying the potential of the control grid of said tube in the same direction as variations in the average value of the supplied video signal to correctly reproduce black level in the supplied video signal as black in the reproduced image.

17. A picture control circuit for a television receiver utilizing a cathode-ray tube, comprising:
means for supplying a video signal having an average value which may vary from scene to scene;
means responsive to the video signal for coupling the A-C components of said video signal to the cathode of the tube;
and means responsive to the average value of the video signal for varying the potential of the screen grid of the cathode-ray tube with respect to the cathode of said tube to limit the amount of beam current flowing in said tube on scenes having a high average brightness value and for inserting a D-C level at the cathode-ray tube to correctly reproduce black level in the supplied video signal as black in the reproduced image.

18. A picture control circuit for a television receiver utilizing a cathode-ray tube, comprising:
means for supplying a video signal having an average value which may vary from scene to scene;
means responsive to the video signal for coupling the A-C components of said video signal and a D-C level representative of the average value of the video signal to control grid of the cathode-ray tube;
and means responsive to the D-C level for varying the potential of the screen grid of the cathode-ray tube with respect to the cathode and in the same direction as variations in the average value of the video signal to limit the amount of beam current in said tube on scenes having a high average brightness value;
and means for varying the cathode potential of said tube in the same direction as variations in the average value of the video signal to correctly reproduce black level in the supplied video signal as black in the reproduced image.

19. A picture control circuit for a television receiver utilizing a cathode-ray tube, comprising:
means for supplying a video signal having an average value which may vary from scene to scene;
means responsive to the video signal for coupling said video signal to the cathode of said cathode-ray tube;
means responsive to the average value of said video signal for varying the potential of the screen grid of the cathode-ray tube with respect to the cathode of said tube in a direction opposite to variations in the average value of the supplied video signal;
and means responsive to the average value of said video signal for varying the potential of the control grid of said tube in the same direction as variations in the average value of the supplied video signal to correctly reproduce black level in the supplied video signal as black in the reproduced image.

References Cited

UNITED STATES PATENTS 3,043,909 7/1962 Loughlin ----------- 178—7.5

JOHN W. CALDWELL, *Acting Primary Examiner.*

R. L. RICHARDSON, *Assistant Examiner.*